(12) United States Patent
Yagoobi et al.

(10) Patent No.: US 6,932,580 B2
(45) Date of Patent: Aug. 23, 2005

(54) ELECTROHYDRODYNAMIC CONDUCTION PUMP

(75) Inventors: Jamal Seyed Yagoobi, Naperville, IL (US); James E. Bryan, Columbia, MO (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 10/333,115

(22) PCT Filed: Jul. 18, 2001

(86) PCT No.: PCT/US01/22803

§ 371 (c)(1),
(2), (4) Date: Jan. 14, 2003

(87) PCT Pub. No.: WO02/07292

PCT Pub. Date: Jan. 24, 2002

(65) Prior Publication Data

US 2003/0206807 A1 Nov. 6, 2003

Related U.S. Application Data

(60) Provisional application No. 60/219,025, filed on Jul. 18, 2000.

(51) Int. Cl.[7] .................................................. F04F 11/00
(52) U.S. Cl. ............................................ 417/48; 417/53
(58) Field of Search ......................... 417/48.5, 53, 48, 417/50; 62/3.1, 259.2

(56) References Cited

U.S. PATENT DOCUMENTS

| | | | |
|---|---|---|---|
| 3,247,091 A | | 4/1966 | Stuetzer ...................... 204/299 |
| 3,267,860 A | * | 8/1966 | Brown .......................... 103/1 |
| 4,316,233 A | * | 2/1982 | Chato et al. ................ 361/233 |
| 4,396,055 A | | 8/1983 | Mitchell ........................ 165/1 |
| 4,651,806 A | * | 3/1987 | Allen et al. .................. 165/96 |
| 5,632,876 A | | 5/1997 | Zanzucchi et al. .......... 204/600 |
| 6,260,579 B1 | * | 7/2001 | Yokota et al. ............... 137/807 |
| 6,374,909 B1 | * | 4/2002 | Jeter et al. ..................... 165/96 |

FOREIGN PATENT DOCUMENTS

| | | | |
|---|---|---|---|
| FR | 1 246 669 | 11/1960 | |
| WO | WO 98/51999 | 11/1998 | .......... G01D/15/14 |
| WO | WO 99/63293 | 12/1999 | ............ F28F/13/16 |

OTHER PUBLICATIONS

Seyed–Yagoobi et al, "Thermal Control and Enhancement of Heat Transport Capacity of Two–Phase Loops with Electro-hydrodynamic Conduction Pumping", 5th Microgravity Fluid Physics and Transport Phenomena Conf., NASA GRC, OH,CP–2002–210470,pp542–565,Aug. 9, 2000.*

Rada et al., "Electrohydrodynamic Pumping of Liquid Nitrogen Using a Mesoscale Ion–Drag Pump", ASME Proceedings of IECEC'01, Jul. 29–Aug. 2, 2001, Savannah, Georgia, paper IECEC2001–TM–13.*

Darabi et al., "An Electrohydrodynamic Polarization Micropump for Electronic Cooling", J. of MicroElectroMechanical Systems, vol. 10, No. 1, Mar. 2001, pp 98–106.*

Patent Abstracts of Japan, vol. 007, No. 089 JP 58 012996 Jan. 25, 1983.

* cited by examiner

*Primary Examiner*—Charles G. Freay
(74) *Attorney, Agent, or Firm*—Flynn, Thiel, Boutell & Tanis, P.C.

(57) ABSTRACT

An electrohydrodynamic (EHD) conduction pump is provided for pumping dielectric liquids, and a particular adaptation for mass transport of isothermal and non-isothermal single phase liquids. The EHD conduction pump does not require direct injection of electric charges into the fluid. The EHD conduction pump includes an EHD pumping section and associated connecting tubes with electrodes arranged in series in the pumping section. The electrodes are coupled to a high voltage low current dc power supply. A positive polarity dc voltage is applied to the electrodes. Various electrode configurations may be used, such as three-needle, hollow-tube, or pin-needle electrode configuration.

43 Claims, 4 Drawing Sheets

Schematic of Pure Conduction Pumping Mechanism

FIG. 1

Schematic of Pure Conduction Pumping Mechanism

FIG. 2

Schematic of static EHD pump

FIG. 3

Assembled 3-needle high voltage electrode
and ring ground electrode (two pairs shown)

FIG. 4

Assembled hollow-tube high voltage electrode
and ring ground electrode (two pairs shown)

FIG. 5

1 pin-needle high voltage electrode
and ring ground electrode (two pairs shown)

FIG. 6

Generated pressure as a function of applied voltage 3-needle voltage electrode design

FIG. 7

Current as a function of apploed voltage with 3-needle high voltage electrode design

FIG. 8

Generated pressure as a function of applied voltage with hollow-tube high voltage electrode design

FIG. 9

Generated pressure as a function of applied voltage with hollow-tube high voltage electrode design

FIG. 10

Generated pressure as a function of applied voltage for three high voltage electrode design; five pairs utilized

ELECTROHYDRODYNAMIC CONDUCTION PUMP

CROSS REFERENCE TO RELATED APPLICATIONS

This application is a national stage application under 35 U.S.C. 371 of PCT/US01/22803 filed Jul. 18, 2001 which claims benefit of U.S. Provisional Application Ser. No. 60/219,025, filed Jul. 18, 2000.

TECHNICAL FIELD OF THE INVENTION

This invention relates in general to the field of electrohydrodynamic pumps, and more particularly, to an electrohydrodynamic conduction pump, and a particular adaptation for mass transport of isothermal and non-isothermal single phase liquids.

BACKGROUND OF THE INVENTION

The electrohydrodynamic (EHD) phenomena involve the interaction of electric fields and flow fields in a dielectric fluid medium. This interaction between electric fields and flow fields can induce the flow motion by electric body force. In general, there are three kinds of EHD pumps operating based on the Coulomb force; induction pumping, ion-drag pumping, and pure conduction pumping.

EHD induction pumping relies on the generation of induced charges. This charge induction in the presence of an electric field takes place due to a non-uniformity in the electrical conductivity of the fluid. Non-uniformity in the electrical conductivity can be caused by the non-uniform temperature distribution and/or an inhomogeneity of the fluid, such as in a two phase fluid. Therefore, induction pumping can not be utilized in an isothermal liquid.

Ion-drag pumping may be used for generating a space charge in an isothermal liquid. Ion-drag pumping generally includes ion injection at a metal/liquid interface for generating the space charge in the isothermal liquid. However, ion-drag pumping is not desirable because it can deteriorate the electrical properties of the working fluid.

SUMMARY OF THE INVENTION

Accordingly, a need has arisen for an improved EHD pumping mechanism that provides isothermal dielectric liquid pumping as well as isothermal and non-isothermal single phase liquid pumping. The present invention provides an EHD conduction pump that addresses shortcomings of prior pumping systems.

According to one embodiment of the present invention, an EHD conduction pump includes an EHD pumping section and associated connecting tubes. Electrodes are arranged in series in the pumping section. The electrodes are connected to a high voltage low current dc power supply, and a positive polarity dc voltage is applied to the electrodes. The electrodes may be configured with a 3-needle, hollow-tube, or pin-needle design.

One major advantage of the EHD conduction pump is that it is the only EHD pumping mechanism that can be utilized to pump isothermal dielectric liquids without requiring direct electric charge injection. The simple design, non-mechanical, lightweight, the rapid control of performance by varying the applied electric field, and low power consumption are all advantages of the application of the EHD conduction pump. Potential applications of the present invention include EHD pumping of the working fluid (in the liquid-phase) in two-phase systems (e.g., capillary pumped loops and heat pipes), in the presence and absence of gravity.

Other technical advantages will be readily apparent to one skilled in the art from the following figures and descriptions.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

In an isothermal liquid, only the Coulomb force which is the force acting on the free charges, can contribute to permanent electrohydrodynamic motion. In the absence of a direct charge injection, pumping can be achieved due to the charges associated with the heterocharge layers of finite thickness in the vicinity of the electrodes which are based on the process of dissociation of a neutral electrolytic species and recombination of the generated ions. This type of pumping is referred to as pure conduction pumping. The conduction pumping mechanism is experimentally investigated here with three different electrode designs. Sufficient pressure heads are generated with very low electric power requirements making the EHD conduction pumping attractive to certain applications such as capillary pumped loops and heat pipes.

Nomenclature

E=electric field
F=electric force exerted on the fluid
I=current
R=radius of the pumping section
V=voltage
$f_e$=electric body force density
q=electric charge density
$r_o$=radius of the high voltage electrode ∈=electric permittivity
ρ=fluid density
Superscript
  +: positive ion
  −: negative ion Introduction The electrohydrodynamic (EHD) phenomena involve the interaction of electric fields and flow fields in a dielectric fluid medium. This interaction between electric fields and flow fields can induce the flow motion by electric body force. The electric body force acting on the molecules can be expressed as follows [1].

$$f_e = qE - \frac{1}{2}E^2 \nabla \varepsilon + \frac{1}{2}\nabla\left[E^2\left(\frac{\partial \varepsilon}{\partial \rho}\right)_T \rho\right] \quad (1)$$

The first term represents the Coulomb force, which is the force acting on the free charges in an electric field. The second and third terms represent the polarization force acting on polarized charges. The third term, the electrostriction term, is relevant only for compressible fluids. Thus, EHD pumps require either a free space charge or a gradient in permittivity within the fluid. In an isothermal single phase liquid, $\nabla \varepsilon$ vanishes, resulting in Coulomb force as the only mechanism for generating a permanent EHD motion.

There are three kinds of EHD pumps operating based on the Coulomb force: induction pumping, ion-drag pumping, and pure conduction pumping. The EHD induction pumping relies on the generation of induced charges. This charge induction in the presence of an electric field takes place due to a nonuniformity in the electrical conductivity of the fluid. Nonuniformity in the electrical conductivity can be caused by the non-uniform temperature distribution and/or an inhomogeneity of the fluid (e.g., a two-phase fluid). Therefore, this pumping mechanism cannot be utilized in an isothermal liquid. There are two main mechanisms for generating a space charge in an isothermal liquid. The first one is associated with the ion injection at a metal/liquid interface and the related pumping is referred to as ion-drag pumping. However, the ion-drag pumping is not desirable because it can deteriorate the electrical properties of the working fluid. The second one is associated with heterocharge layers of finite thickness in the vicinity of the electrodes which are based on the process of dissociation of the neutral electrolytic species and recombination of the generated ions [2]. This type of pumping is referred to as pure conduction pumping. The conduction term here represents a mechanism for electric current flow in which charged carriers are produced not by injection from electrodes, but by dissociation of molecules within the fluid. The visible difference between the ion-drag pumping and pure conduction pumping is in the flow direction. In a typical ion-drag pump, the high voltage is supplied to the emitter electrode (e.g., a sharp needle) and the collector electrode (e.g., a ring) is grounded. In this case the flow direction will be from the high voltage emitter electrode to the ground collector electrode. The opposite applies to the pure conduction pumping with this particular design where the flow direction will be from the ground electrode to the high voltage electrode. However, it should be emphasized that the flow direction is dependant on the electrodes (high voltage and ground) designs. For the pure conduction pumping, electrodes with relatively large radius of curvature are required. Furthermore, to reduce the effects of ion injection in the pure conduction pumping, the electrodes, especially the high voltage electrodes, should not contain any sharp points or edges.

The present invention illustrates EHD pumping through pure conduction phenomenon. Very limited work has been conducted in this field and the majority of the published papers in this area have mistakenly assumed that the electrostriction force (the third term in Eq.(1)) was responsible for the net flow generated in an isothermal liquid. As mentioned above, this issue was addressed and clarified in a recent work by Atten and Seyed-Yagoobi [2]. One application of the present invention is an EHD pump for a two-phase loop (e.g., capillary pumped loops or heat pipes) to be operated in the microgravity environment. The pump will be installed in the liquid return passage (isothermal liquid) from the condenser section to the evaporator section. The simple design, non-mechanical, lightweight, the rapid control of performance by varying the applied electric field, and low power consumption are all advantages of the application of EHD. However, it is to be recognized that the application of this technology is truly applicable to isothermal and non-isothermal single phase liquid.

Theoretical Review

In general, the I versus V curve for a wide range of the applied voltage is highly non-linear and can be divided into three different regimes. In the low electric field regime, linear behavior is observed which is mainly due to dissolved electrolytic impurities [3]. If the liquid contains a very small number of ions (for instance, due to impurities), the electrostatic charges on the solid surface will attract the counterions in the liquid. The rearrangement of the charges on the solid surface and the balancing charges in the liquid is called the electrical double layer. Because of the electrostatic interaction, the ionic concentration near the solid surface is higher than that in the bulk liquid far away from the solid surface. Immediately next to the solid surface, there is a layer of ions which is strongly attracted to the solid surface and immobile. This layer is called the compact layer, and is normally about 0.5 nm thick. From the compact layer to the uniform bulk liquid, the ionic concentration gradually reduces to that of bulk liquid. Ions in this region are affected less by the electrostatic interaction and are mobile. This layer is called the diffuse layer of the electrical double layer. The thickness of the diffuse layer depends on the bulk ionic concentration and electrical properties of the liquid [4]. Under this low electric field regime, the conduction is mainly due to positive and negative ions generated by dissociated molecules. Dissociation and recombination are in dynamic equilibrium, When an electric field exceeding 1 kV/cm is applied, the rate of dissociation exceeds that of the recombination and it further increases at higher electric fields. Thus, away from the diffuse layer, there is a non-equilibrium layer where the dissociation-recombination reactions are not in equilibrium [5].

Figure 1:
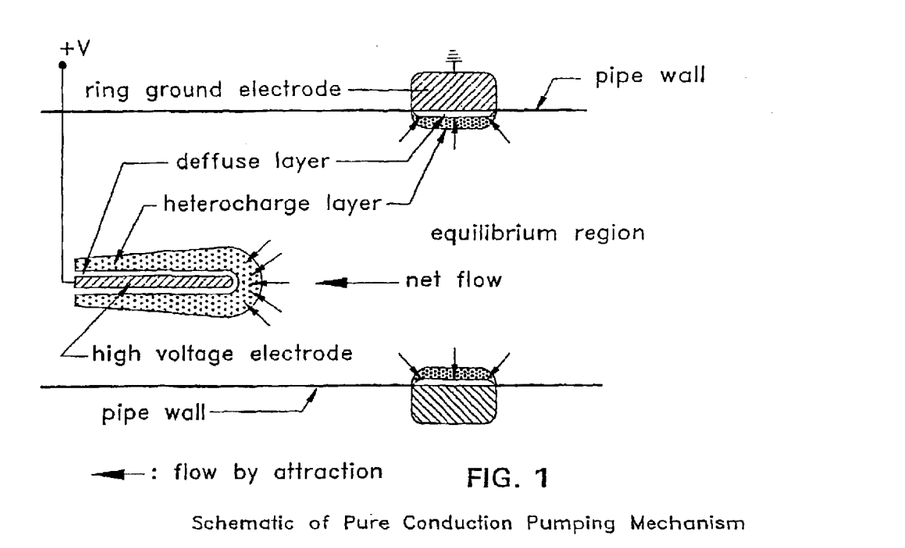
FIG. 1 is a schematic illustration of pure conduction pumping mechanism.

The conduction mechanism in this regime is mainly caused by the ionic dissociation and the creation of heterocharges, i.e., charges having the opposite polarity from that of the electrode they are adjacent to. The I versus V behavior in this regime is sub-ohmic showing only a slightly increased current with increased voltage. The thickness of this heterocharge layer is proportional to the corresponding relaxation time of the working fluid and the strength of the local electric field. This regime is directly related to pure conduction pumping mechanism. As shown in FIG. 1, the attraction between the electrodes and heterocharge layer induces the fluid motion near the electrode from the liquid side to the electrode side. With this electrode configuration, the net axial motion around the ring ground electrode is almost canceled because of the geometrical symmetry. Thus, only the motion around the high voltage electrode can contribute to the net axial flow. Since the electric field is high near the electrode of small radius of curvature, the thickness of the corresponding heterocharge layer and the pressure across it will be high as well. Atten and Seyed-Yagoobi [2] estimated that the resultant force in the needle-plate configuration can be analytically expressed as $$F = -\frac{3\pi}{8} \frac{\varepsilon V^2}{[\ln(R/r_0)]^2}$$

where $r_o$ is the radius of the high voltage electrode and R is radius of the pumping section. This implies that the force or pressure generation by pure conduction pumping has quadratic dependence on the applied voltage and is proportional to the electrical permittivity.

In the high electric field regime ($\approx$100 kV/cm), the current suddenly increases steeply with an increase in the voltage due to the injection of ions from the electrodes into the liquid. This phenomenon is mainly controlled by the electrochemical reactions at the electrode-liquid interface and therefore depends critically on the composition and geometry of the electrodes [6]. Beyond this electric field level, the ion-drag pumping mechanism will be dominant.

Figure 2:
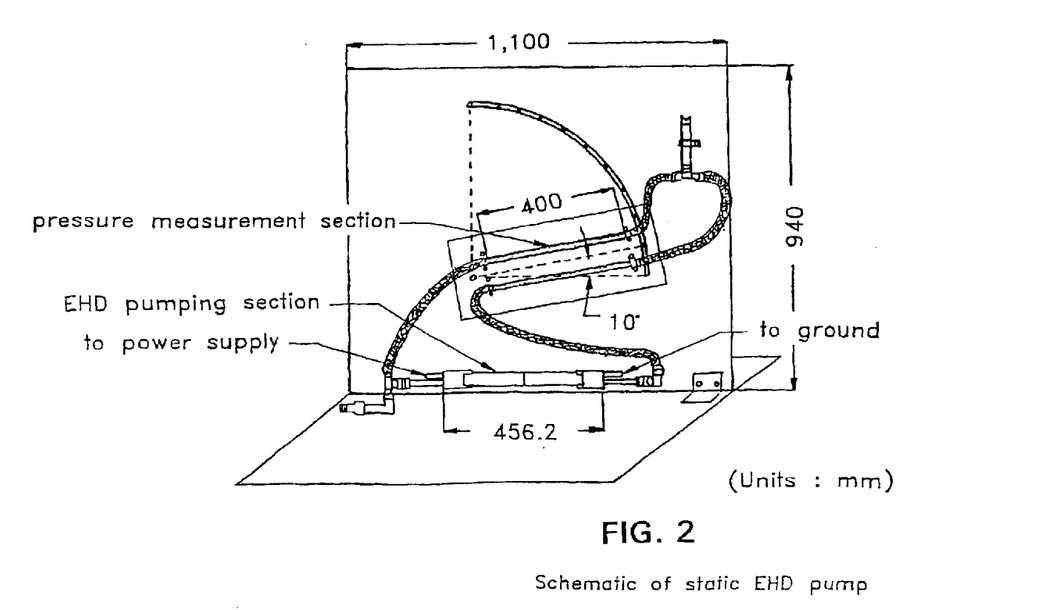
FIG. 2 is a schematic illustration of static EHD pump.

FIG. 2 is a diagram illustrating an apparatus used to investigate the pure conduction pumping phenomenon. It includes an EHD pumping section, transparent pressure measurement section, and connecting tubes. Up to five pairs of electrodes are arranged in series in the pumping section. The high voltage electrodes are connected to a high voltage low current DC, power supply (Glassman EW50R12). Positive polarity DC voltage is applied to high voltage electrodes. The ring electrodes are electrically grounded. The pressure measurement section is a glass manometer with the inclination angle of 10 to 90 degrees. Three different designs (3-needle, hollow-tube, and pin-needle) were investigated for the high voltage electrodes. The ground electrodes were made of a simple ring flushed against pumping section inner tube wall. These ground electrodes were designed as rings to avoid interference with the net axial flow generated by the high voltage electrodes as discussed in the previous section. Furthermore, the ring ground electrodes provided a negligible drag coefficient.

Figure 3:
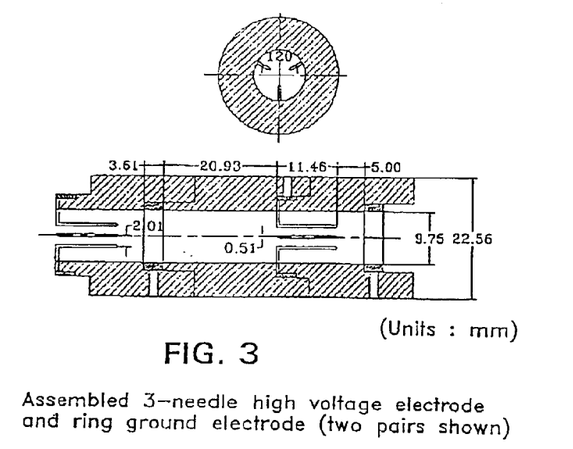
FIG. 3 is a schematic illustration of an assembled 3-needle high voltage electrode and ring ground electrode (two pairs shown)
Figure 4:
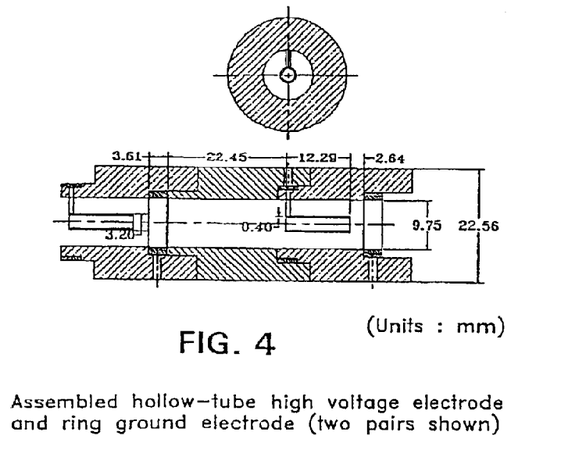
FIG. 4 is a schematic illustration of an assembled hollow-tube high voltage electrode and ring ground electrode (two pairs shown)
Figure 5:
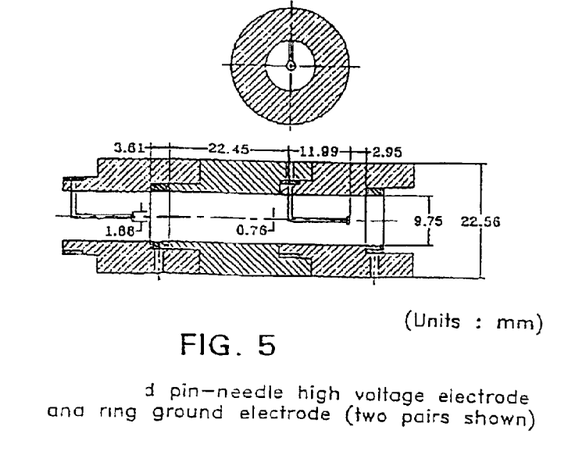
FIG. 5 is a schematic illustration of an assembled pin-needle high voltage electrode and ring ground electrode (two pairs shown)

FIGS. 3, 4, and 5 show the assembled electrode pairs inside a pipe for 3-needle, hollow-tube, and pin-needle high voltage electrode designs, respectively. The 3-needle and pin-needle electrodes are made of steel while the hollow-tube electrodes are made of brass. The ground ring electrodes are made of stainless steel. The high voltage electrodes and the ground electrodes were not coated, however, they were rounded to reduce the ion injection. The working fluid was R-123 refrigerant. The experiments were all conducted at the fluid temperature of 25° C. At this temperature, the electric permittivity, conductivity, and density of R-123 are 42.78 pF/m, $2.7 \times 10^{-8}$ S/m, and 1464 kg/m$^3$, respectively.

The errors associated with the data presented in the next section were primarily due to the height difference measurements in the pressure measurement section of the apparatus (see FIG. 2). Focusing only on 10 to 20 kV applied voltage range, the maximum percent errors in pressure head generation were 3.5%, 0.8%, and 3.7% for 3-needle, hollowtube, and pin-needle high voltage electrode designs, respectively. These maximum errors corresponded to 10 kv due to the smallest pressure heads generated within the above applied voltage range. The maximum percent uncertainties for the voltage and current values were 2.0% and 1.5%, respectively.

Figure 6:
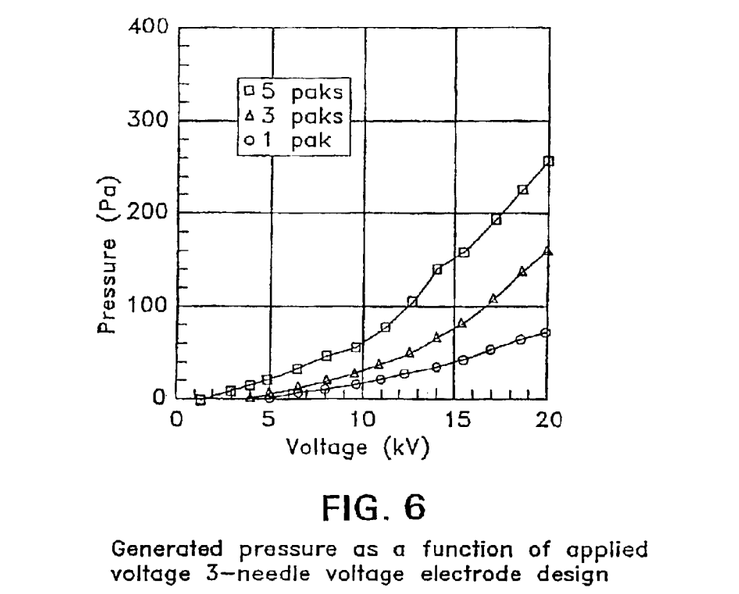
FIG. 6 is a graphical illustration showing generated pressure as a function of applied voltage with 3-needle high voltage electrode design.
Figure 7:
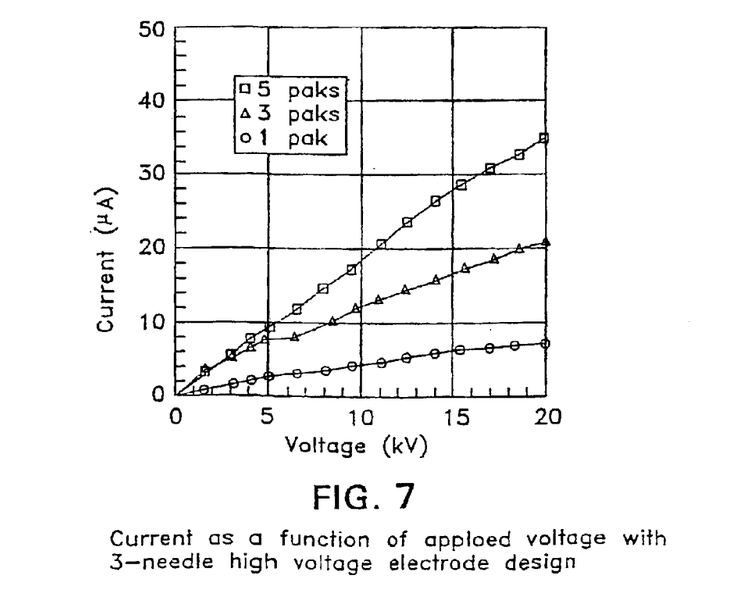
FIG. 7 is a graphical illustration showing a current as a function of applied voltage with 3-needle high voltage electrode design.

The pressure heads and the corresponding current levels generated by the pump are presented below as a function of the applied voltage. The results are given for all three electrode designs. FIGS. 6 and 7 present the generated pressure and the corresponding current level as a function of applied voltage for the 3-needle high voltage electrode design, respectively. The maximum pressure head achieved is approximately 269 Pa at 20 kV with 0.7 W of electric power consumption with five pairs. A higher pressure head can be obtained by increasing the number of electrode pairs.

Figure 8:
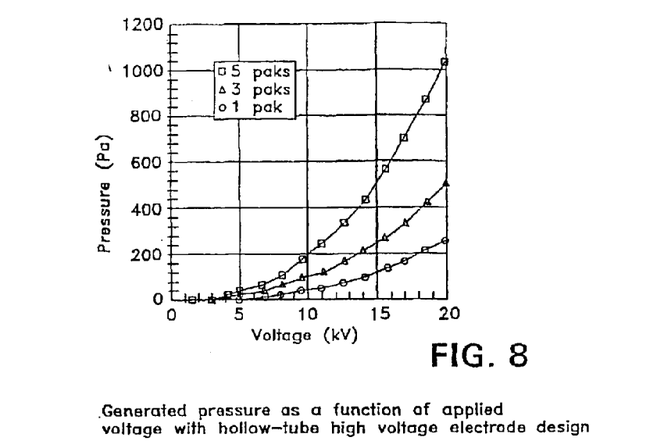
FIG. 8 is a graphical illustration showing a generated pressure as a function of applied voltage with hollow-tube high voltage electrode design.
Figure 9:
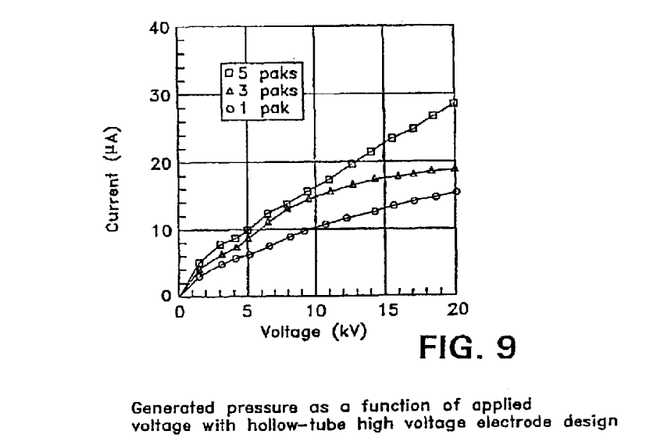
FIG. 9 is a graphical illustration showing a current as a function of applied voltage with hollow-tube high voltage electrode design.

FIGS. 8 and 9 provide the generated pressure and consumed current as a function of applied voltage for the hollow-tube high voltage electrode design, respectively. The maximum pressure head achieved with this design is approximately 1034 Pa at 20 kV with 0.57 W of electric power consumption using five pairs of electrodes. According to FIGS. 6 and 8, the generated pressures with the 3-needle electrode and hollowtube electrode design have nearly a quadratic dependence on the applied voltage which is consistent with the theoretical model presented by Atten and Seyed-Yagoobi [2].

The pressure generation is proportional to the number of energized electrode pairs, however, it is less than the arithmetic sum of the pressures generated per each electrode pair. This is partially due to the negative interaction between the neighboring electrode pairs even though the distance between the neighboring electrode pairs is much longer than the distance between the individual high voltage electrode and corresponding ground electrode. The I versus V curves in FIGS. 7 and 9 show that the current level is very low and it increases slightly with the applied voltage implying the ohmic or subohmic behavior and total or partial absence of the ion injection. The current data presented on FIGS. 7 and 9 were obtained within the initial 10 minutes of the operation.

Figure 10:
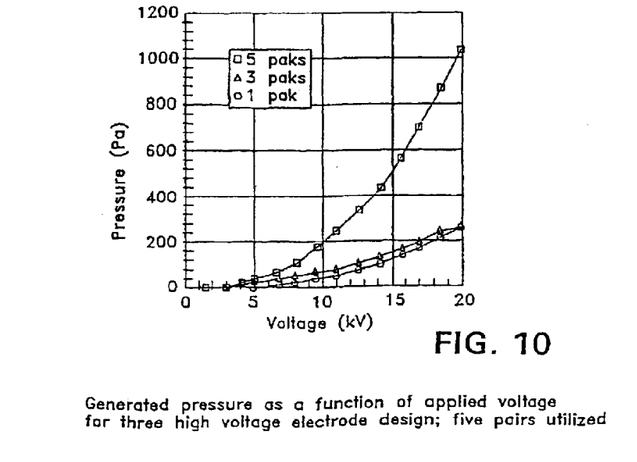
FIG. 10 is a graphical illustration showing a generated pressure as a function of applied voltage for three high voltage electrode design; five pairs utilized.

The individual results for the pin-needle high voltage electrode design are not explicitly provided here. However, the generated pressures were lower than those of the 3-needle and hollow-tube electrode designs. FIG. 10 shows the generated pressure as a function of the applied voltage for the three electrode designs. Five electrode pairs were utilized for the data presented in FIG. 10. The hollow-tube electrode design provides much better performance than the other two electrode designs. This is mainly due to the higher available projected area (perpendicular to the axial direction) with the hollow-tube design compared to the other two designs. In addition, the performance is better with the hollow-tube design because of a shorter distance between the edge of the high voltage electrode and ground electrode resulting in higher electric fields compared to the 3-needle and pin-needle designs. The maximum pressure head achieved with the hollow-tube electrode is 1034 Pa at 20 kV while it is approximately 270 Pa with the 3-needle and pin needle electrodes.

Beyond the applied voltage of 20 kV, the ion injection may become significant resulting in a sudden decrease in the generated pressure and a rapid increase in the current level. This was not observed in any of the experiments conducted at below 20 kV. In order to investigate the pump performance over time, the pump was continuously operated for over an hour at 15 kV with three pairs of the 3-needle electrode design. The generated pressure was maintained approximately at a constant level of 90 Pa throughout this time period. However, the current level dropped from its initial value of 12 µA to 7 µA at 60th minute, after which it remained nearly constant implying a significant reduction in the power consumption.

Note that these generated pressure and consumed current levels do not quite match with those of FIGS. 6 and 7, respectively, with three pairs at 15 kV. This is because the data given in the figures are the averages of several trials whereas the long term data given above are based on a single experiment. The data presented in FIGS. 6, 8, and 10 correspond to steady state. However, the current values provided in FIGS. 7 and 9, unlike the generated pressure data, were recorded once the generated pressure seized to change following the application of a high voltage. As discussed above, for a given operating condition, the current required a very long time to reach its steady state value. Thus, the results given in FIGS. 7 and 9 correspond to the maximum current values under given operating conditions.

The EHD pumping based on conduction phenomenon was experimentally investigated with three different high voltage electrode designs (3-needle, hollow-tube, pin-needle). The hollow-tube high voltage electrode design provided the best performance. The maximum pressure head achieved with five pairs of the hollow-tube electrode design-was 1034 Pa at 20 kV with maximum power consumption of 0.57 W. More importantly, the work presented here confirmed the feasibility of EHD pumping through conduction phenomenon.

References

1. Melcher, J. R., 1981, *Continuum Electromechanics*, Cambridge, MIT Press.
2. Atten, P. and Seyed-Yagoobi, J., 1999, "Electrohydrodynamically Induced Dielectric Liquid Flow Through Pure Conduction in Point/Plane Geometry—Theory"; *Proceedings of the 13th International Conference on Dielectric Liquids*, CD ROM, Nara, Japan.
3. Felici, N. J., 1971, "D.C. Conduction in Liquid Dielectrics", *Direct Current*, Vol. 2, No. 3, pp. 90–99.
4. Yang, C. and Li, D., 1998, "Analysis of Electrokinetic Effects on the Liquid Flow in Rectangular Microchannels", *Colloids and Surfaces, A: Physicochemical and Engineering Aspects* 143, pp. 339–353.
5. Zhakin, A. 1., 1998, "Conduction Models in Dielectric Liquids", *Electrohydrodynamics*, edited by A. Castellanos, Chapter 6, Springer Wien New York.
6. Richter, A. and Sandmaier, H., 1990, "An Electrohydrodynamic micropump", *3rd IEEE Workshop on Micro Electromechanical Systems, IEEE MEMS*-90, Napa Valley, Calif., USA.

What is claimed is:

1. An electrohydrodynamic conduction liquid pumping system, comprising:
   a vessel configured to contain a liquid therein;
   a single pair or multi pairs of electrodes disposed in a longitudinally spaced apart relationship to each other inside the vessel and configured to be oriented in the liquid; and
   a power supply coupled to the electrodes and generate electric fields in between each electrode pair and induce heterocharge layers within the liquid in close proximity of the electrodes to induce a net longitudinal pumping of the liquid, relative to the vessel.

2. The system of claim 1, wherein the liquid is a two phase fluid, said electrodes being configured to be oriented in a liquid phase of the two phase fluid.

3. The system of claim 2, wherein the vessel is an elongate conduit, the power supply being operably configured to supply a positive or negative direct current voltage to each of the electrode pairs to induce longitudinal pumping of the liquid phase of the two phase fluid along the conduit.

4. The system of claim 2, wherein the vessel is an elongate conduit having a first surface and a second surface oriented in a thermal energy transfer system;
   wherein the single pair or multi pairs of electrodes are disposed in a spaced apart relationship to each other and longitudinally along the first surface of the conduit; and
   wherein the electric forces enhance thermal energy transfer between a fluid and the conduit by inducing longitudinal pumping of a liquid phase of the fluid in contact with the first surface of the conduit along the first surface of the conduit.

5. The system of claim 4, wherein the first surface of the conduit comprises an exterior surface of the conduit and the second surface of the conduit comprises an interior surface of the conduit, and wherein a cooling medium is disposed in contact with the interior surface, and wherein longitudinal pumping of the liquid phase of the fluid along the exterior surface of the conduit enhances condensation of the fluid on the exterior surface of the conduit.

6. The system of claim 4, wherein the power supply is operably configured to induce heterocharge layers within the liquid in close vicinity of the electrodes to cause longitudinal pumping of the liquid phase of the fluid along the first surface of the conduit.

7. The system of claim 4, wherein the power supply is operably configured to supply a positive or negative direct current voltage to each of the electrode pairs to induce longitudinal pumping of the liquid phase of the fluid along the conduit.

8. The system of claim 4, wherein the first surface of the conduit comprises an interior surface of the conduit and the second surface of the conduit comprises an exterior surface of the conduit, and wherein a cooling medium is disposed in contact with the exterior surface, and wherein longitudinal pumping of the liquid phase of the fluid along the interior surface of the conduit enhances condensation of the fluid on the interior surface of the conduit.

9. The system of claim 4, wherein the first surface of the conduit comprises an interior surface of the conduit and the second surface of the conduit comprises an exterior surface of the conduit, and wherein a heating medium is disposed in contact with the exterior surface, and wherein longitudinal pumping of the liquid phase of the fluid along the interior surface of the conduit facilitates vaporization of the fluid on the interior surface of the conduit.

10. The system of claim 4, and in the case of external condensation, wherein the plurality of electrodes comprises:
    a first set of electrodes disposed in a spaced apart relationship relative to each other and longitudinally in a first direction along the conduit; and
    a second set of electrodes disposed in a spaced apart relationship relative to each other and longitudinally in a second direction along the conduit, the second direction being substantially opposite the first direction; and
    wherein the power supply is operable to induce longitudinal pumping of the liquid phase of the fluid along the first surface of the conduit in the first and second directions.

11. The system of claim 4, wherein the first surface of the conduit comprises an exterior surface of the conduit and the second surface of the conduit comprises an interior surface of the conduit, and wherein a heating medium is disposed in contact with the interior surface, and wherein longitudinal pumping of the liquid phase of the fluid along the exterior surface of the conduit enhances vaporization of the fluid on the exterior surface of the conduit.

12. The system of claim 1, wherein the vessel is an elongate conduit, the multi electrical electrode pairs being disposed in a spaced apart relationship to each other and oriented at spaced intervals longitudinally along the conduit.

13. An electrohydrodynamic conduction liquid pumping system, comprising:
    a vessel configured to contain a liquid therein;
    a single pair or multi pairs of electrodes disposed in a spaced apart relationship to each other inside the vessel and configured to be oriented in the liquid;
    a power supply coupled to the electrodes and operable to generate electric fields in between each electrode pair, the electric forces inducing a net liquid movement relative to the vessel; and
    wherein each pair of electrodes includes a first electrode oriented inside said vessel and having a high voltage from said power supply connected thereto and a second electrode mounted internally of said vessel and in axially spaced relation to said first electrode, said second electrode being oriented so that it is flush with an inside surface of said vessel and is electrically coupled to a ground of said power supply.

14. The system of claim 13, wherein said first electrode comprises three needle electrodes equidistantly spaced from each other and from an inside surface of said vessel and are each connected to said high voltage from said power supply.

15. The system of claim 13, wherein said first electrode comprises a needle electrode centrally disposed in said vessel.

16. The system of claim 13, wherein said first electrode comprises at least one hollow tube centrally disposed in said vessel.

17. The system of claim 16, wherein said vessel is an elongate conduit, an axis of said at least one hollow tube extends coaxially with and parallel to an axis of said elongate conduit.

18. The system of claim 13, wherein said at least one electrode comprises a plurality of electrodes oriented on said vessel and having a high voltage from said power supply connected to each thereof.

19. A method for electrohydrodynamic conduction pumping of either an isothermal or non-isothermal single phase liquid in a vessel, comprising:
    providing a single pair or multi pairs of electrodes disposed in the vessel in a longitudinally spaced apart relationship to each other and oriented in the liquid;
    coupling a power supply to each pair of electrodes and configuring the power supply to supply a direct current voltage differential to each pair of electrodes to generate heterocharge layers within the liquid in close vicinity of the electrodes; and
    inducing a net longitudinal pumping of the liquid in the vessel using the power supply.

20. The method of claim 19, wherein said liquid is a dielectric liquid.

21. The method of claim 19, wherein the vessel is an elongate conduit, wherein the providing step includes a disposing of the electrodes along the length of the conduit and wherein said inducing step induces a net longitudinal pumping of the liquid along the conduit.

22. A method for electrohydrodynamic conduction pumping of a fluid to facilitate thermal energy transfer, comprising:
    providing a single pair or multi pairs of electrodes disposed about a conduit, the plurality of electrodes disposed in a spaced apart relationship to each other and longitudinally along the conduit;
    coupling a power supply to each pair of electrodes to supply a direct current voltage differential to each pair of electrodes to generate heterocharge layers within the liquid in close vicinity of the electrodes; and
    enhancing thermal energy transfer of the fluid with the conduit by inducing a net pumping of a liquid phase of the fluid along the first surface of the conduit using the power supply.

23. The method of claim 22, wherein providing the single pair or multi pairs of electrodes comprises providing the electrodes along the conduit.

24. The method of claim 22, wherein providing the electrodes comprises providing the electrodes disposed on an exterior surface of the conduit, and further comprising disposing a cooling medium in contact with an interior surface of the conduit, and wherein enhancing thermal energy transfer comprises enhancing condensation of the fluid on the exterior surface of the conduit by inducing longitudinal pumping of the liquid phase of the fluid along the exterior surface of the conduit.

25. The method of claim 22, wherein providing the electrodes comprises providing the conductors disposed on an interior surface of the conduit, and further comprising disposing a cooling medium in contact with an exterior surface of the conduit, and wherein enhancing thermal energy transfer comprises enhancing condensation of the fluid on the interior surface of the conduit by inducing longitudinal pumping of the liquid phase of the fluid along the interior surface of the conduit.

26. The method of claim 22, wherein providing the electrodes comprises providing the electrodes disposed on an interior surface of the conduit, and further comprising disposing a heating medium in contact with an exterior surface of the conduit, and wherein enhancing thermal energy transfer comprises enhancing evaporation of the fluid on the interior surface of the conduit by inducing longitudinal pumping of the liquid phase of the fluid along the interior surface of the conduit.

27. The method of claim 22, wherein providing the electrodes comprises providing the electrodes disposed on an exterior surface of the conduit, and further comprising disposing a heating medium in contact with an interior surface of the conduit, and wherein enhancing thermal energy transfer comprises enhancing vaporization of the fluid on the exterior surface of the conduit by inducing longitudinal pumping of the liquid phase of the fluid along the exterior surface of the conduit.

28. The method of claim 22, wherein providing the electrodes comprises providing the electrodes disposed in a spaced apart relationship along the conduit.

29. The method of claim 22, wherein providing the plurality of electrodes comprises providing the plurality of electrodes disposed along a portion of a length of the conduit.

30. An electrohydrodynaic thermal energy transfer system, comprising:
    an outer conduit; and
    a plurality of inner conduits disposed within the outer conduit;
    a single pair or multi pairs of electrodes disposed about a first surface of at least one of the inner conduits, the plurality of electrodes disposed in a spaced apart relationship to each other and longitudinally along the at least one inner conduit;

a direct current power supply coupled to the electrodes to enhance thermal energy transfer between a fluid disposed within the outer conduit and the at least one inner conduit by inducing a net longitudinal pumping of a liquid phase of the fluid in contact with the first surface of the at least one inner conduit along the first surface of the at least one inner conduit; and wherein each pair of electrodes includes at least one electrode oriented inside said inner conduit and having a high voltage from said power supply connected thereto and a ring electrode mounted internally of said conduit and in axially spaced relation to said at least one electrode, said ring electrode being oriented so that it is flush with an inside surface of said inner conduit and is electrically coupled to a ground of said power supply.

31. The system of claim 30, wherein said at least one electrode comprises three needle electrodes equidistantly spaced from each other and from an inside surface of said inner conduit and are each connected to said high voltage from said power supply.

32. The system of claim 30, wherein said at least one electrode comprises a needle electrode centrally disposed in said inner conduit.

33. The system of claim 30, wherein said at least one electrode comprises a plurality of electrodes oriented on said inner conduit and having a high voltage from said power supply connected to each thereof.

34. The system of claim 30, wherein the first surface of the at least one inner conduit comprises an exterior surface of the at least one inner conduit, and wherein a cooling medium is disposed in contact with an interior surface of the at least one inner conduit, and wherein longitudinal pumping of the liquid phase of the fluid enhances condensation of the fluid on the exterior surface of the at least one inner conduit.

35. The system of claim 30, wherein the first surface of the at least one inner conduit comprises an interior surface of the at least one inner conduit, and wherein a cooling medium is disposed within the outer conduit surrounding the at least one inner conduit, and wherein longitudinal pumping of the liquid phase of the fluid enhances condensation of the fluid on the interior surface of the at least one inner conduit.

36. The system of claim 30, wherein the first surface of the at least one inner conduit comprises an interior surface of the at least one inner conduit, and wherein a heating medium is disposed within the outer conduit and surrounding the at least one inner conduit, and wherein longitudinal pumping of the liquid phase of the fluid enhances vaporization of the fluid on the interior surface of the at least one inner conduit.

37. The system of claim 30, wherein the first surface of the at least one inner conduit comprises an exterior surface of the at least one inner conduit, and wherein a heating medium is disposed in contact with an interior surface of the at least one inner conduit, and wherein longitudinal pumping of the liquid phase of the fluid facilitates vaporization of the fluid on the exterior surface of the at least one inner conduit.

38. The system of claim 30, wherein the direct current power supply is operable to supply a voltage difference between two conductors of each pair to induce longitudinal pumping of the liquid phase of the fluid along the first surface of the at least one inner conduit.

39. The system of claim 30, wherein the plurality of conductors are disposed along a portion of a length of the at least one inner conduit.

40. The system of claim 30, wherein the at least one conduit is constructed having a substantially circular configuration, and wherein the conductors are disposed about a portion of a circumference of the at least one conduit.

41. An electrohydrodynamic thermal energy transfer system, comprising:

an outer conduit; and a plurality of inner conduits disposed within the outer conduit;

a single pair or multi pairs of electrodes disposed about a first surface of at least one of the inner conduits, the plurality of electrodes disposed in a spaced apart relationship to each other and longitudinally along the at least one inner conduit;

a direct current power supply coupled to the electrodes to enhance thermal energy transfer between a fluid disposed within the outer conduit and the at least one inner conduit by inducing a net longitudinal pumping of a liquid phase of the fluid in contact with the first surface of the at least one inner conduit along the first surface of the at least one inner conduit; and wherein said at least one electrode comprises at least one hollow tube centrally disposed in said inner conduit.

42. The system of claim 41, wherein axis of said at least one hollow tube extends coaxially with and parallel to an axis of said inner conduit.

43. An electrohydrodynamic thermal energy transfer system, comprising:

an outer conduit; and a plurality of inner conduits disposed within the outer conduit;

a single pair or multi pairs of electrodes disposed about a first surface of at least one of the inner conduits, the plurality of electrodes disposed in a spaced apart relationship to each other and longitudinally along the at least one inner conduit;

a direct current power supply coupled to the electrodes to enhance thermal energy transfer between a fluid disposed within the outer conduit and the at least one inner conduit by inducing a net longitudinal pumping of a liquid phase of the fluid in contact with the first surface of the at least one inner conduit along the first surface of the at least one inner conduit; and wherein the at least one inner conduit is disposed above at least one other inner conduit such that longitudinal pumping of the liquid phase of the fluid substantially prevents the liquid phase of the fluid from falling onto the at least one other inner conduit.

* * * * *

UNITED STATES PATENT AND TRADEMARK OFFICE
CERTIFICATE OF CORRECTION

PATENT NO.     : 6,932,580 B2                                                   Page 1 of 1
DATED          : August 23, 2005
INVENTOR(S)    : Jamal Seyed Yagoobi et al.

It is certified that error appears in the above-identified patent and that said Letters Patent is hereby corrected as shown below:

<u>Column 7,</u>
Line 57, after "electrodes and" insert -- configured to operably --.

<u>Column 10,</u>
Line 59, change "electrohydrodynaic" to -- electrohydrodynamic --.

Signed and Sealed this

Seventh Day of March, 2006

JON W. DUDAS
*Director of the United States Patent and Trademark Office*